(12) United States Patent
Bolender et al.

(10) Patent No.: US 8,590,832 B2
(45) Date of Patent: Nov. 26, 2013

(54) ENGINE INTAKE FLAP FOR BEING ARRANGED ON THE HOUSING OF AN AIR INTAKE OF AN AIRCRAFT ENGINE, AS WELL AS ENGINE WITH SUCH AN ENGINE INTAKE FLAP AND AIRCRAFT SYSTEM

(75) Inventors: Lars Bolender, Hamburg (DE); Sébastien Wagnon, Oberdorf (CH)

(73) Assignee: Airbus Operations GmbH, Hamburg (DE)

(*) Notice: Subject to any disclaimer, the term of this patent is extended or adjusted under 35 U.S.C. 154(b) by 464 days.

(21) Appl. No.: 12/865,931

(22) PCT Filed: Feb. 4, 2009

(86) PCT No.: PCT/EP2009/000753
§ 371 (c)(1),
(2), (4) Date: Aug. 3, 2010

(87) PCT Pub. No.: WO2009/098044
PCT Pub. Date: Aug. 13, 2009

(65) Prior Publication Data
US 2010/0307442 A1  Dec. 9, 2010

Related U.S. Application Data

(60) Provisional application No. 61/025,857, filed on Feb. 4, 2008.

(30) Foreign Application Priority Data

Feb. 4, 2008  (DE) .......................... 10 2008 007 469

(51) Int. Cl.
*B64D 33/02* (2006.01)
*F02G 3/00* (2006.01)

(52) U.S. Cl.
USPC ....................................... 244/53 B; 60/39.092

(58) Field of Classification Search
USPC .................. 244/53 B, 134 A; 137/15.1, 15.2; 60/39.091–39.093
See application file for complete search history.

(56) References Cited

U.S. PATENT DOCUMENTS 2,623,610 A * 12/1952 Buechel .......................... 55/306
2,652,131 A *  9/1953 Kelly .............................. 55/306

(Continued)

FOREIGN PATENT DOCUMENTS

CN  1271808 C   8/2006
DE  60109255 T2  4/2006

(Continued)

OTHER PUBLICATIONS

International Search Report for corresponding PCT application PCT/EP2009/000753, dated May 25, 2009.

(Continued)

*Primary Examiner* — Philip J Bonzell
(74) *Attorney, Agent, or Firm* — Ingrassia Fisher & Lorenz P.C.

(57) ABSTRACT

An engine inlet flap for mounting on the housing of an air inlet or air inlet duct of an engine of an aircraft, having a first end and a second end arranged in opposition thereto at a distance therefrom in the longitudinal direction of the inlet flap, where the longitudinal direction in the given installation is aligned against the flow direction of the air flowing into the engine; and the inlet flap includes an inlet flap base body with a connector device for a jointed connector for jointed connection of the inlet flap base body to the housing of the air inlet or air inlet duct, with a rotational axis running along the second end, an inlet flap extension piece structurally integrated with the inlet flap base body, with a first and a second lateral piece, which extends from the inlet flap base body on the two opposed lateral edges of the inlet flap running in the longitudinal direction with a number of transverse struts or longitudinal struts, arranged in the leading region of the engine inlet flap.

22 Claims, 3 Drawing Sheets

(56) References Cited

U.S. PATENT DOCUMENTS

| | | | |
|---|---|---|---|
| 2,704,136 A * | 3/1955 | Rainbow | 55/306 |
| 2,752,111 A * | 6/1956 | Schairer | 244/57 |
| 3,329,377 A * | 7/1967 | Peterson et al. | 244/53 B |
| 3,652,036 A | 3/1972 | Sans | |
| 3,662,556 A * | 5/1972 | Poucher et al. | 60/226.1 |
| 3,664,612 A | 5/1972 | Skidmore | |
| 3,770,228 A | 11/1973 | Traksel | |
| 4,165,849 A * | 8/1979 | Fox | 244/113 |
| 4,203,566 A * | 5/1980 | Lord | 244/57 |
| 4,463,903 A * | 8/1984 | Nightingale | 239/265.17 |
| 4,655,413 A * | 4/1987 | Genssler et al. | 244/53 B |
| 4,782,658 A | 11/1988 | Perry | |
| 6,050,527 A | 4/2000 | Hebert | |
| 6,676,378 B2 * | 1/2004 | Corbin et al. | 416/160 |
| 7,031,356 B2 | 4/2006 | Park et al. | |
| 7,055,304 B2 | 6/2006 | Courtot | |
| 8,011,172 B2 | 9/2011 | Lockwood | |
| 8,206,079 B2 | 6/2012 | Bagnall | |
| 2002/0071766 A1 * | 6/2002 | Corbin et al. | 416/229 A |
| 2004/0047397 A1 | 3/2004 | Park et al. | |
| 2005/0109011 A1 | 5/2005 | Courtot | |
| 2006/0102779 A1 * | 5/2006 | Campbell et al. | 244/53 B |
| 2008/0092516 A1 | 4/2008 | Lockwood | |
| 2008/0273972 A1 | 11/2008 | Bagnall | |
| 2010/0102172 A1 | 4/2010 | Bardwell | |

FOREIGN PATENT DOCUMENTS

| | | |
|---|---|---|
| DE | 602004008841 T2 | 6/2008 |
| EP | 1988259 A2 | 11/2008 |
| GB | 2440133 A | 1/2008 |
| GB | 2442967 A | 4/2008 |

OTHER PUBLICATIONS

German Office Action for corresponding German Patent application 102008007469.1-13, dated Jul. 13, 2009 (non English).

International Preliminary Report on Patentability for corresponding PCT application PCT/EP2009/000753, dated Sep. 7, 2010.

Chinese Office Action for corresponding Chinese Patent application 200980104160.8 dated Oct. 9, 2012.

Office Action for corresponding DE Patent Application No. 102008007469.1, dated Apr. 26, 2013.

\* cited by examiner

ENGINE INTAKE FLAP FOR BEING ARRANGED ON THE HOUSING OF AN AIR INTAKE OF AN AIRCRAFT ENGINE, AS WELL AS ENGINE WITH SUCH AN ENGINE INTAKE FLAP AND AIRCRAFT SYSTEM

CROSS REFERENCE TO RELATED APPLICATIONS

This application claims priority to PCT Application No. PCT/EP2009/000753, filed Feb. 4, 2009; which claims priority to German Patent Application No. DE 10 2008 007 469.1, filed Feb. 4, 2008, and claims the benefit to U.S. Provisional Patent Application No. 61/025,857, filed Feb. 4, 2008, the entire disclosures of which applications are hereby incorporated by reference.

BACKGROUND

The invention pertains to an engine intake flap for being arranged on the housing of an air intake or air intake channel of an aircraft engine, as well as an engine with such an engine intake flap and an aircraft system with an engine in the form of an auxiliary engine. The invention specifically pertains to an extension part for a pivoted base body of an intake flap that is provided for preventing a reduction or obstruction of the intake during ice formation and features a first lateral edge for producing a connection with an intake flap base body, a second lateral edge that lies opposite of the first lateral edge and a third and a fourth lateral edge that respectively extend from the first lateral edge to the second lateral edge. The invention furthermore pertains to an intake flap, an intake flap with such an extension part and an engine with an intake flap.

The intake may consist, in particular, of an engine intake such as, e.g., the engine intake of an aircraft. In addition, the intake may also serve as an air supply for other modules and components such as, e.g., a turbine wheel for an auxiliary engine or a generator.

The formation of ice on intake flap front edges and, in particular, the engine intake flap front edges may lead to a significant pressure loss at the engine air intake. This is associated with the obstruction of the engine flap intake opening due to the sudden or continuous formation of ice while the aircraft is in flight. This formation of ice results in a reduced power of the turbine due to flow losses. The following solutions are known from the prior art and used in practical applications:
 pneumatic deicing mats,
 electrothermal deicing,
 hot-air deicing,
 liquid anti-icing (on the ground only).

Due to the lack of reliable methods for detecting the formation of ice while an aircraft is in flight, it is currently common practice to already take countermeasures as soon as an aircraft is situated in meteorological conditions that could lead to ice formation.

The known methods for preventing or removing ice require energy that must be obtained from the on-board system. If ice forms on engine intakes, in particular, it is imperative to take effective countermeasures in a timely fashion so as to prevent the intake of ice and damages to the turbine blades resulting thereof. This can only be realized in a reliable fashion by installing a complex control system with a suitable adjustment and/or control at the critical locations.

SUMMARY OF THE INVENTION

The invention therefore is based on the objective of optimizing the intake flow and to propose simple means for simultaneously preventing the engine intake from being obstructed due to the formation of ice while the aircraft is in flight.

This object is met with the characteristics of one or more embodiments disclosed and described herein. Other embodiments of the invention are also disclosed and described herein.

The inventive intake flap and, in particular, the plurality of intake flaps for an engine is intended for being arranged on the housing of an air intake or air intake channel of an aircraft engine. The intake flap is designed for being arranged on the front edge region of the intake or the intake channel, i.e., the edge region facing the flow during its intended use. The housing may consist of the aircraft structure, into which the intake channel is integrated, or of the housing of an external engine.

According to one embodiment of the inventive engine intake flap that is designed for being arranged on the housing of an air intake or air intake channel of an aircraft engine and features a first end and a second end that lies opposite of and is spaced apart from the first end in the longitudinal direction of the intake flap, wherein the longitudinal direction is directed opposite to the flow direction of the air flowing into the engine during the intended use, the intake flap features:
 an intake flap base body with a connecting device for a hinged connection in order to hinge the intake flap base body to the housing of the air intake or air intake channel with a hinge axis extending along the second end,
 an intake flap extension part that is structurally integrated into the intake flap base body and features a first and a second lateral part that respectively originate at the intake flap base body and extend on the two lateral edges of the intake flap that lie opposite of one another and extend in the longitudinal direction,
 a plurality of cross braces that are arranged on and extend between the lateral parts transverse to the longitudinal direction.

In this case, the intake flap base body and the intake flap extension part may be manufactured in one piece. Alternatively, the intake flap extension part may be mounted on the intake flap base body in the form of a component that can be attached to the intake flap base body.

According to one embodiment of the invention, the cross braces are arranged on the lateral parts in a rotationally rigid fashion. Alternatively or additionally, at least some of the cross braces may be arranged on the lateral parts such that they are rotatable about their longitudinal axis.

It is generally possible to realize the cross braces with a wing-shaped cross section.

In this case, as well as in all other designs of the cross braces, at least some cross braces may be springably pre-stressed into a starting position.

In the embodiments of the invention, it is furthermore possible to manufacture the cross braces of elastic material that is bent and/or distorted by the air flow that occurs during the intended use and flows along the longitudinal direction, namely to such a degree that an ice layer formed on the cross braces can be cracked off.

According to one embodiment, it is generally possible to arrange at least one longitudinal web that is arranged on the intake flap base body and extends in the longitudinal direction between the lateral parts, wherein a plurality of cross braces respectively extends between a lateral part and a longitudinal web or between two longitudinal webs.

According to another embodiment of the invention, an engine intake flap is provided that is designed for being arranged on the housing of an air intake or air intake channel of an aircraft engine and features a first end and a second end that lies opposite of and is spaced apart from the first end in the longitudinal direction of the intake flap, wherein the longitudinal direction is directed opposite to the flow direction of the air flowing into the engine during the intended use, and wherein the intake flap features:

- an intake flap base body with a connecting device for a hinged connection in order to hinge the intake flap base body to the housing of the air intake or air intake channel with a hinge axis extending along the second end,
- an intake flap extension part that is structurally integrated into the intake flap base body and features a first and a second lateral part that respectively originate at the intake flap base body and extend on the two lateral edges of the intake flap that lie opposite of one another and extend in the longitudinal direction,
- a plurality of longitudinal braces that are arranged on the intake flap base body and respectively extend in the longitudinal direction of the intake flap.

In this case, the intake flap base body and the intake flap extension part may be manufactured in one piece. Alternatively, the intake flap extension part may be mounted on the intake flap base body in the form of a component that can be attached to the intake flap base body.

In the embodiments of the invention, it is furthermore possible to manufacture the longitudinal braces of elastic material that is bent and/or distorted by the air flow that occurs during the intended use and flows along the longitudinal direction, namely to such a degree that an ice layer formed on the longitudinal braces can be cracked off.

According to another aspect of the invention, an engine is provided that features an air intake formed by an engine housing, wherein at least one engine intake flap according to one embodiment of the invention is arranged on the front edge that is directed opposite to the air flow occurring during the intended use. In this case, it is possible to arrange several engine intake flaps adjacent to one another along the circumference of the engine housing referred to the flow direction.

According to another aspect of the invention, an engine is provided that features engine intake flaps, on which at least one actuator for adjusting the respective engine intake flap about its hinge axis is respectively arranged, wherein the engine is provided with an actuating device that has an actuating function with an interface to a flight control system and/or an engine control system and is realized in such a way that it generates command signals for controlling the actuators of the engine intake flaps in response to the receipt of air data from the flight control system and/or of a current or required engine power from the flight control system and/or the engine control system and transmits these commands signals to the actuators of the engine intake flaps so as to adjust the engine intake flaps about their hinge axis (A) and thusly adjust the flow in the intake.

According to another embodiment, an engine is provided, in which the engine intake flaps are designed with longitudinal braces that are rotatable about their longitudinal axis, wherein said engine features actuators that are coupled to at least some of the longitudinal braces in order to vary the rotational position of the cross braces, and wherein the engine is provided with an actuating device that has an actuating function with an interface to a flight control system and/or an engine control system and is realized in such a way that it can actuate the actuators for varying the rotational position of the cross braces in response to the receipt of air data from the flight control system and/or of a current or required engine power from the flight control system and/or the engine control system so as to adjust the cross braces about their longitudinal axis and thusly adjust the flow in the intake.

The actuating function may, in particular, be realized in such a way that it utilizes the flow velocity of the aircraft as air data.

It would also be possible to use data in the form of a flow velocity and/or temperature of the flowing air that is measured in the region of the engine intake as input signal to be used by the actuating function.

According to the invention, an aircraft system is provided that features an auxiliary energy supply unit with an engine that is realized in the form of an auxiliary engine and in accordance with an inventive embodiment. In this case, it is possible, in particular, for the actuating function to have a function that makes it possible to move the flaps between a shielding position, in which the minimum throughput of the intake flow is adjusted, into an open position, in which the maximum throughput of the intake flow is adjusted, wherein the aircraft system features an energy supply unit that transmits a command signal to the actuating function in order to move the engine intake flaps from their shielding position into their open position when the energy supply unit activates the auxiliary engine.

According to the invention, the extension part for the intake flap base body has a first lateral edge for connecting the extension part to an intake flap base body, a second lateral edge that lies opposite of and is spaced apart from the first lateral edge in the longitudinal direction, as well as a third and a fourth lateral edge, wherein the third and the fourth lateral edge respectively extend from the first lateral edge to the second lateral edge. In other words, the extension part has a body that is laterally bounded or defined by four lateral edges. When the extension part or the flap extension part is attached to the base body that is coupled to an intake component in a stationary or pivoted fashion, a reduction of the intake due to the formation of ice on the intake flap is prevented and, in particular, the obstruction of the intake during ice formation is reduced at least in certain operating states.

In this case, the third and the fourth lateral edge may have a length L1 in the longitudinal direction of the extension part and form a recess on the second lateral edge that has two opposite lateral edge inner sides extending along the third and fourth lateral edge, as well as a recess rear edge that extends transverse to the third and the fourth lateral edge and connects their inner ends. This means that the recess is bounded by the extension body on three sides, but the fourth side is not bounded by part of the extension body. The recess rear edge may also be formed by an edge of the intake flap base body rather than an edge of the extension body. The length L1 of the third and the fourth lateral edge may be identical, but it is also possible that both lengths differ such the one third or fourth side of the extension part protrudes further from the intake flap base body than the other third or fourth side.

As an extension of the intake flap base body, the extension part may form a continuation of the shape of the base body, for example, it may have the same curvature radius as the base body. However, the extension part of a bent base body may also be realized straight or have another shape that does not form a continuation of the shape of the base body. The extension part may be connected to the base body in an abutting fashion or fixed on the upper surface or on the underside of the base body, wherein the extension part may also be attached to the base body in a connecting region or inserted into an open or opened end of the base body.

The extension part may also feature more than one recess that are arranged adjacent to one another, in particular, transverse to the longitudinal direction, wherein said recesses may be formed by one or more braces dividing the above-described single recess and one respective recess is formed between two adjacent braces.

In this case, the braces may consist of cross braces that extend from the third lateral edge to the fourth lateral edge. The recess between the third and the fourth lateral edge may also contain longitudinal webs, i.e., webs that extend parallel to the third and the fourth lateral edge and increase the stability of the cross braces. In this case, the webs may either be connected to the cross braces only or rigidly connected or realized integrally with the recess rear edge and rigidly or movably guide the cross braces.

Although all cross braces may have an identical shape, they may also vary with respect to their geometry. All recesses may have the same size, wherein the cross braces may also be spaced apart from one another by different distances such that recesses of different sizes would be formed between the cross braces. Furthermore, two cross braces may respectively extend parallel to one another such that the cross braces are always spaced apart from one another by the same distance or two cross braces could be angled relative to one another such that the width of the recess between two cross braces changes from one side wall to the other.

The cross braces may be rigidly coupled to the third and the fourth lateral edge, i.e., the cross braces cannot move relative to the third and the fourth lateral edge. However, the cross braces could also be rotatably supported in the lateral edges such that they are able to pivot about a longitudinal axis of the cross brace.

Longitudinal webs may be also be arranged between the third side wall and the fourth side wall, wherein these longitudinal webs stabilize the cross braces due to the fact that they prevent the cross braces from bending. In this case, the cross braces may be divided into partial cross braces that respectively extend from one side wall to the nearest longitudinal web or the longitudinal webs may feature openings, through which the cross braces extend from one side wall to the next. If several longitudinal braces are provided, a few of the cross braces may also feature openings while other cross braces serve for supporting or being connected to these partial cross braces.

The pivotable cross braces may be prestressed into their idle position, for example, by means of a spring force. They can be deflected from this idle position in dependence on an air flow acting thereupon while the aircraft is in flight, wherein the cross braces are returned into their idle position due to the spring force when the aerodynamic forces diminish, for example, after landing. The intensity of the air flow acting upon the cross brace may be dependent on the flow velocity and/or the direction, from which the air flows against or around the extension part.s The cross braces that are rigidly held in the lateral edges may consist of or contain a flexible, elastic material such that they can turn or twist under the stress of the air acting thereupon and return back to their normal shape while or after the stress diminishes.

In order to create a low aerodynamic drag and the least turbulence possible in the region of the extension, the surfaces or at least parts of the surfaces of the cross braces may lie on an imaginary extension of the surface contour of an upper side of the extension part. The cross braces may have a constant material thickness or feature regions with a different material thickness, for example, a reduced material thickness on their edges that can improve the air flow around the cross braces and/or influence their flexibility behavior in the air flow so as to more effectively prevent the formation of ice in the region of the extension or to counteract an excessive ice formation in this region while the aircraft is in flight.

All in all, the extension part may also be realized in such a way that the recesses are punched or cut out of a compact extension part body by means of a laser beam or water jet.

The braces may also consist of longitudinal braces that extend in the longitudinal direction of the extension part, wherein the openings formed between the longitudinal braces are open on the second side of the extension part. The ends of the openings situated in the recess may lie on a common line, but the openings may also extend into the recess by different distances. For example, outer openings could be longer or shorter than inner openings or vice versa. The width of the openings may also vary. The longitudinal braces may have the same thickness at all locations or feature regions with a different material thickness. This would make it possible, for example, to influence the vibration behavior of the longitudinal braces in the air flow, for example, so as to counteract the formation of ice on the longitudinal braces or to prevent an excessive ice formation in this region.

The longitudinal braces may be manufactured in one piece together with the extension such that the surfaces of the longitudinal braces seamlessly transform into the surface of the extension. The ends of the openings on the side of the intake flap base body may be realized in a linear or semicircular fashion and processed accordingly, for example milled, in order to better introduce the forces acting upon the longitudinal braces into the extension.

The extension may, in principle, contain different materials such as, for example, one material for the extension body and another material for the braces. The braces may also contain different materials in accordance with their respective requirements, for example, a core of a torsionally rigid material and an outer skin of flexible material applied thereon. However, the extension may also consist of one material such as, for example, of metal or a material with metallic properties or of a composite material such as, for example, GFK.

The invention furthermore pertains to an engine intake flap with an intake flap base body that has a first intake flap base body end for being hinged to an engine housing, an extension part of the above-described type, the first lateral edge of which is connected to a second intake flap base body end that lies opposite of the first intake flap base body end. In this case, the extension part may freely protrude from the intake flap base body opposite to the flow direction during the intended use.

The intake flap base body and the extension part may be manufactured in one piece, i.e., they form an integral component. However, the extension part may also be realized separately of the intake flap base body and subsequently attached and rigidly connected to an existing intake flap base body. The connection may be realized inseparably, for example, in the form of a welded, bonded or riveted connection or separably, for example, in the form of a screw connection or snap-on connection.

The connecting part may be provided with a matching connecting region for each existing type of intake flap base body such that it can also be utilized on aircraft that are already in use.

The invention also pertains to an engine with a turbine that runs particularly fast, an engine housing and at least one above-described engine flap. Several engine flaps may be arranged adjacent to one another along the circumference of the engine housing and opened and/or closed individually or collectively by means of a control in dependence on the required engine power. In this case, the side of the extension part that lies nearest the engine housing when the engine flap is closed forms the underside of the extension part and the side that faces away from the engine housing in this case forms the upper side.

BRIEF DESCRIPTION OF THE DRAWINGS

Embodiments of the invention are described below with reference to the attached figures. These figures specifically show.

DETAILED DESCRIPTION OF THE INVENTION

Figure 1:
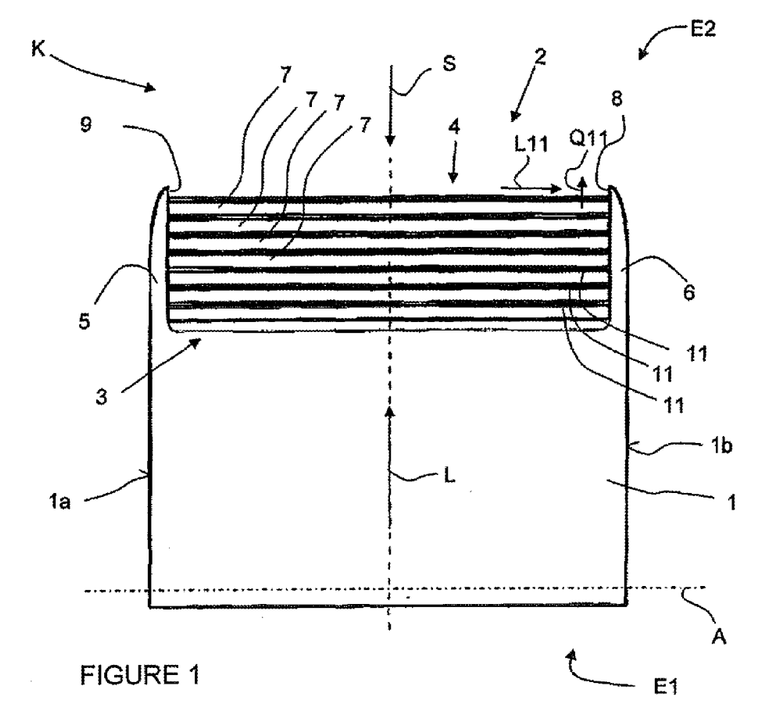
FIG. 1, illustrates a top view of a first embodiment of the inventive intake flap with a base body and an extension part with cross braces integrally arranged thereon.

FIG. 1 shows a top view of an intake flap K of an aircraft engine 100 that is detached from the engine 100 in its basic form. The inventive intake flap K and, in particular, the plurality of intake flaps for an engine is or are intended for being arranged on the housing 102 of an air intake or an air intake channel or on a housing of an aircraft engine. The intake flap K is designed for being arranged on the front edge region of the intake or the intake channel, i.e., the edge region facing the flow during its intended use. With respect to an engine 100 that is installed into the aircraft structure, the housing may consist of the partial aircraft structure, into which the intake channel is integrated, or of the housing of an external engine. The edge region is, referred to the longitudinal axis of the aircraft, the foremost structural region, at which the intake leads into the structure or into the engine housing. The precise location for the arrangement of the inventive intake flap K is determined for each individual instance in accordance with a special aerodynamic and mechanical load configuration. The engine intake flap K is composed of an intake flap base body 1 and the intake flap extension part 2. The intake flap extension part 2 is structurally integrated into the intake flap base body 1, i.e., this intake flap base body 1 and the intake flap extension part 2 are manufactured in one piece or the intake flap extension part 2 can be mounted on the intake flap base body 1 in the form of a component that can be attached to the intake flap base body 1.

The inventive engine intake flap K is designed for being arranged on the housing of an air intake or air intake channel of an aircraft engine and features a first end E1 and a second end E2 that lies opposite of and is spaced apart from the first end in the longitudinal direction L of the intake flap K. During the intended use of the engine intake flap K to be arranged on the housing of an air intake or air intake channel, the longitudinal direction L is directed opposite to the flow direction S of the air flowing into the engine. The intake flap K features an intake flap base body 1 with a connecting device for a hinged connection in order to hinge the intake flap base body 1 to the housing of the air intake or air intake channel with a hinge axis A extending along the second end E2.

The engine intake flap K furthermore features an intake flap extension part 2 that is structurally integrated into the intake flap base body 1 and features a first and a second lateral part 5, 6 that respectively originate at the intake flap base body 1 and extend on the two lateral edges 1a, 1b of the intake flap K that lie opposite of one another and extend in the longitudinal direction L.

Figure 2:
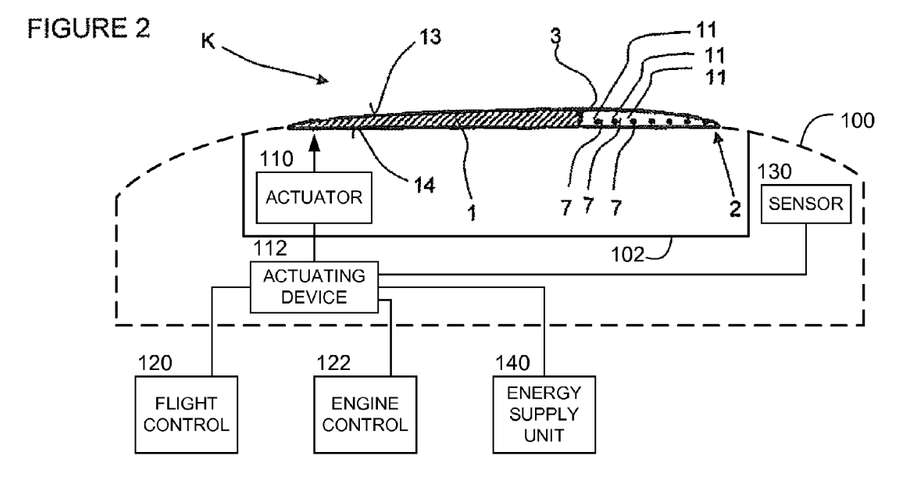
FIG. 2, illustrates a lateral section through the intake flap according to FIG. 1.

In the embodiment shown in FIGS. 1 and 2, the intake flap extension part 2 features a plurality of cross braces 11 that are arranged on the lateral parts 5, 6 and extend between these lateral parts transverse to the longitudinal direction (L), namely such that they extend between the third side wall and a first lateral part 5 in the form of a lateral extension part and the fourth side wall or a second lateral part 6 in the form of another lateral extension part of the extension 2.

This means that recesses 7 are formed between the cross braces 11. The recesses 7 extend between two facing inner sides 8, 9 of the lateral parts 5 and 6 that respectively extend on the facing inner sides of the extension part and along the third and fourth side wall 5, 6 and feature an edge that connects the inner ends of the inner sides.

The integral extension 2 may be inseparably connected to the intake flap base body 1 with its first side wall 3 such that the base body 1 and the extension 2 optically form a coherent intake flap. In this case, the intake flap base body 1 and the third and fourth side walls 5, 6 may form a common envelope with a consistent curvature along the directions of its flat extent. Furthermore, the extension 2 has a second lateral edge 4 that lies opposite of and is spaced apart from the first lateral edge 3 in the longitudinal direction of the extension part 2. The intake flap extension part 2 may, in particular, may be mounted on the intake flap base body 1 in the form of a component that can be attached to the intake flap base body 1.

The cross braces 11 may be connected to the side wall or the lateral parts 5, 6. To this end, the cross braces 11 may be manufactured in the form of separate parts and subsequently connected to the extension 2 in the third and fourth side walls 5, 6. However, the cross braces 11 may also be realized in one piece with the extension 2 or with a surface of the extension 2, in which case the recesses 7 are subsequently cut into the extension 2 by means of conventional cutting methods. Suitable cutting methods are, for example, laser cutting methods.

If the cross braces 11 are manufactured in the form of separate parts, they may be connected to the extension part 2 rigidly, i.e., such that they are immovable relative to the extension part 2. However, the cross braces 11 may also be movably connected to the extension part 2, wherein the term movable in this context refers to the cross braces 11 being supported in a pivoted fashion in the inwardly directed side wall of the first lateral part 5 and/or in the inwardly directed side wall of the second lateral part 6, and wherein the maximum pivoting angle of the cross braces 11 is constructively predetermined. This movable support of the cross braces 11 in the side walls 5, 6 is realized in such a way that the cross braces 11 can be adjusted by the flow forces of the air flowing against the cross braces that occur in-flight and in the flow S, for example, in order to maintain the aerodynamic drag of the cross braces 11 as low as possible in dependence on the degree, to which the inner flap is opened, or to optimize the flow behavior of the flow S.

The movable cross braces 11 may, for example, the prestressed into the idle position by means of a not-shown spring such that they can return to their idle position after a pivoting movement once the flow forces acting upon the cross braces diminish.

The cross braces 11 may be connected to the extension part 2 in a rigid or pivoted fashion. For this purpose, they may be manufactured of an elastic, flexible material or such a material that they can be distorted by the flow forces acting thereupon in order to minimize the aerodynamic drag as described above or to optimize the state of the flow in the intake. This distortion also makes it possible to counteract a build-up of ice on the cross braces 11 due to the fact that the cross braces 11 guide the ice through the recesses 7 and away from the air intake and the ice is separated from the surface of the cross braces 11, for example cracked off, due to the distortion of the cross braces 11. This makes it possible to achieve a reliable deicing of the intake flap or the intake region with constructive measures only, namely without an external energy supply and without utilizing a controller and/or detector for detecting the formation of ice in this region.

The cross braces 11 may have a constant material thickness in the longitudinal direction L11 and in the transverse direction Q11, i.e., they may have the shape of a flat rectangular rod. However, the material thickness may also vary such that, for example, each cross brace 11 has the shape of a wing or extends into the flow S with a pointed longitudinal edge. The cross braces may consist of hollow bodies, compact bodies of one material or bodies consisting of several materials with or without cavities. A cross brace that is made of several materials may feature, for example, a hard core and an outer skin that is relatively soft and able to distort in the flow. Regardless of the design, the flow forces acting upon the cross braces 11 may not only lead to a distortion thereof, but also a vibration that additionally counteracts the formation of ice on the braces.

In FIG. 2, the intake flap K according to FIG. 1 is illustrated in the form of a sectioned side view. This figure shows the intake flap base body 1 and the integrated extension part 2 with the cross braces 11. The intake flap base body 1 and the extension part 2 together with the first lateral part 5 and the second lateral part 6 form a common surface 13 with a constant, i.e., unvarying curvature extending in the longitudinal direction L and a common underside 14 of the intake flap K. In this case, the underside 14 is the side of the intake flap that faces the engine intake.

Figure 3:
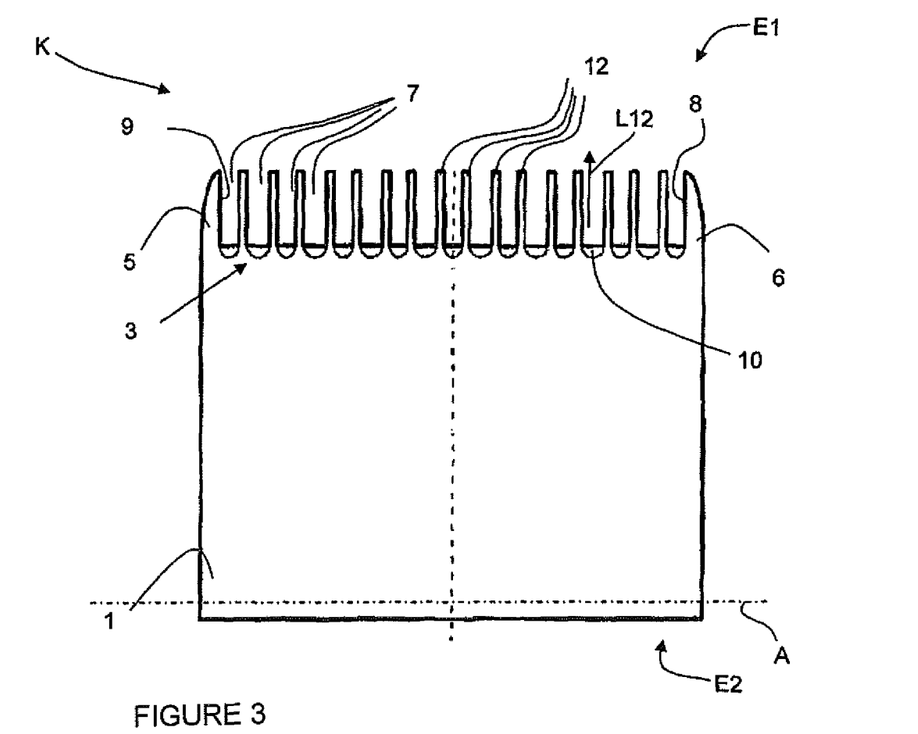
FIG. 3, illustrates a top view of another embodiment of the inventive intake flap with a base body and an extension part with longitudinal braces integrally arranged thereon.

FIG. 3 shows another embodiment of the inventive engine intake flap K or the extension part 2. The engine intake flap K features a plurality of longitudinal braces 12 that are arranged on the intake flap base body 1 and respectively extend in the longitudinal direction L of the intake flap K. This means that recesses 7 are formed between the longitudinal braces 12. The longitudinal braces 12 may be realized in one piece with the extension part 2 or in the form of separate parts that are connected to the extension part 2, for example, by means of bonding or welding or with rivets or screws. In the embodiment shown, the longitudinal braces 12 are realized in one piece with the extension part 2. This embodiment provides the advantage that the connection between the longitudinal braces 12 and the extension part 2 does not contain any seam that could lead to turbulences of the air flowing past this region.

The longitudinal braces 12 can be set in vibration by the flow forces acting thereupon while the aircraft is in flight and thusly counteract the formation of ice and/or separate already formed ice similar to the above-described cross braces 11.

Analogous to the cross braces 11 according to FIG. 1, the longitudinal braces 12 of the extension 2 are formed between a third side wall 5 and a fourth side wall 6. However, since the side walls 5, 6 are not needed for supporting or mounting the longitudinal braces 12 in this embodiment, they may also form longitudinal braces 12 themselves.

The longitudinal braces 12 may have a constant material thickness in the longitudinal direction and the transverse direction or a varying material thickness, for example, a greater material thickness in the region of the transition of the longitudinal brace 12 into the extension part 2 and a lesser material thickness at the tip. This would cause the occurring flow forces to initially set the tips of the longitudinal braces 12 into vibration and the formation of ice could be reliably prevented, in particular, in this critical region.

At the transition of the longitudinal braces 12 into the connecting part 2, a recess rear wall 10 is formed between two respective longitudinal braces. This transition may be realized abruptly in the form of a step, but this could lead to turbulence of the air flow in this region. In order to prevent this air turbulence, the transition may be realized continuously such that the air can largely flow in a nearly undisturbed fashion.

Figure 4:
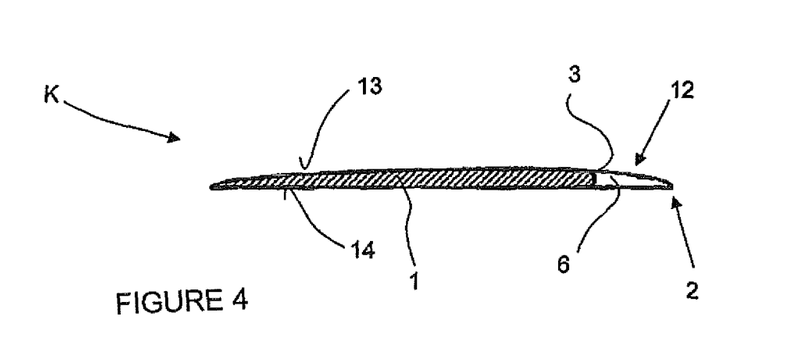
FIG. 4, illustrates a section through the intake flap according to FIG. 3.

According to the side view shown in FIG. 4, the longitudinal braces 12 may be designed in such a way that they form a continuation of the surface of the intake flap base body 1 and the intake flap that is composed of the intake flap base body 1 and the extension part 2 has, if viewed from the side, a closed form with a continuous upper surface 13 and a continuous underside 14.

Figure 5:
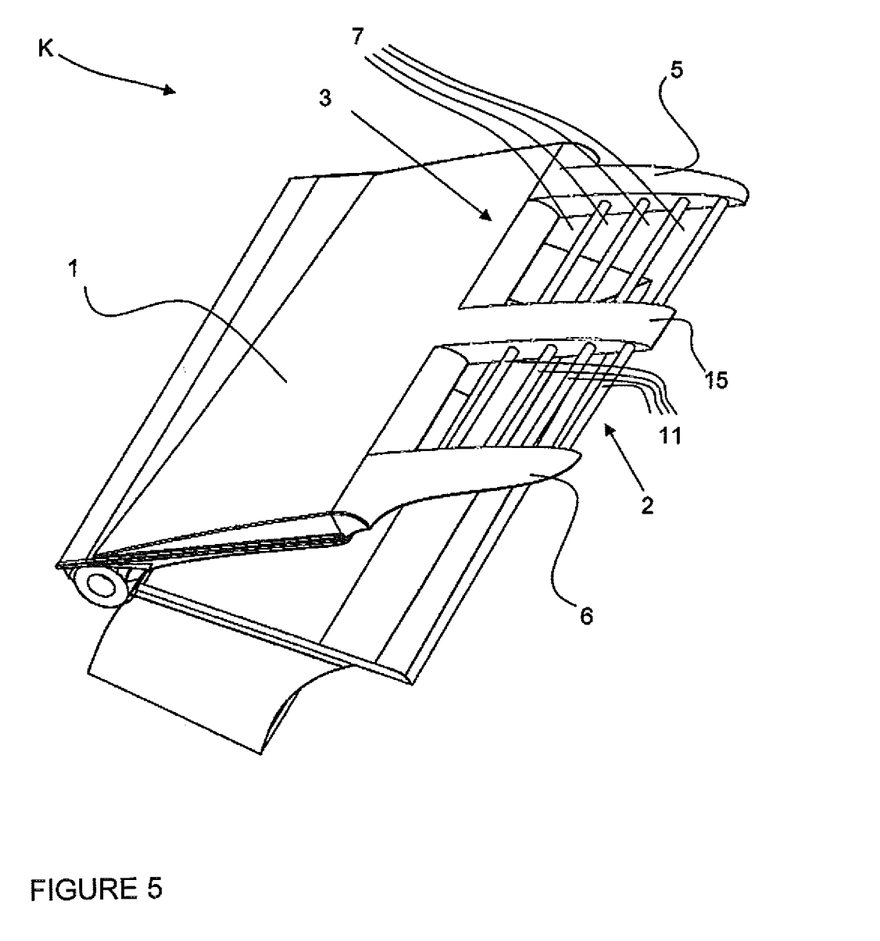
FIG. 5, illustrates a perspective representation of another embodiment of the inventive intake flap with an intake flap base body and an extension part with cross braces arranged thereon.

FIG. 5 shows a third embodiment of the inventive extension part 2, in which at least one longitudinal web 15 that is arranged on the intake flap base body 1 and extends in the longitudinal direction L is arranged between the lateral parts 5, 6 and a plurality of cross braces 11 respectively extends between a lateral part 5, 6 and a longitudinal web 15 or between two longitudinal webs 15. The extension part 2 may, in particular, consist of a separate component that can be subsequently connected to or mounted on an existing intake flap base body 2.

The extension part 2 is or can be connected to the intake flap base body 2 that represents a standard intake flap in this case on a first lateral edge 3. The connection between the intake flap base body 1 and the extension part 2 is realized in such a way that the extension part 2 cannot move relative to the intake flap base body 1. This connection can be produced with mechanical means such as rivets or screws. However, the extension part 2 may also be connected to the intake flap base body by means of a bonded or welded connection. In order to ensure the required stability of the connection, the extension part 2 may feature, for example, a connecting section that is schematically illustrated in FIG. 5 or realized differently, wherein this connecting section is situated adjacent to the first side wall and can be bonded to the underside 14 of the intake flap base body 1 in order to connect the connecting part 2 to the intake flap base body. With respect to its length and width, the connecting part can be no larger than the underside 14 of the intake flap base body 1, but it may also cover part of the underside 14 only.

Although the extension part 1 that is realized in the form of a separate component and subsequently connected to the intake flap base body 1 is illustrated with cross braces 11 in FIG. 5, it may also feature longitudinal braces 12. In the embodiment shown, the connecting part 2 features a longitudinal web 15 in the region of the cross braces, namely in the center between the third side wall 5 and the fourth side wall 6. Although only one additional web 15 is illustrated in FIG. 5, it would also be possible to arrange several webs 15 adjacent to one another. The webs 15 serve for supporting the cross braces 11 and thusly prevent the cross braces 11 from bending. One longitudinal web 15 may suffice for this purpose depending on the length of the cross braces.

The cross braces may have a length that corresponds to the distance between one of the side walls 5, 6 and the nearest web 15 or, if several webs 15 are provided, the distance between two webs 15. This means that a cross brace 11 is composed of several partial cross braces in this case. The relatively short partial cross braces can be realized in a relatively high torsional rigidity fashion or their material and material thickness can be chosen such that they still have a sufficient flexibility for being deformed by the air flow acting thereupon and thusly counteracting the formation of ice despite their relatively short length. The partial cross braces may be supported in the side walls 5, 6 and/or longitudinal webs 15 in a pivoted fashion as described above or rigidly connected thereto. It would even be conceivable to manufacture the respective components in one piece, for example, of composite material.

The longitudinal web/s 15 may also be realized in such a way that it/they form/s passages for the cross braces 11. This means that the cross braces 12 are only supported in or rigidly connected to the third side wall 5 and the fourth side wall 6 and extend through openings in the longitudinal webs 15. This increases the stability of the cross braces 12 against bending and the cross braces are additionally guided in the region of the longitudinal webs.

The openings in the longitudinal webs 15 may have a diameter that allows the cross braces 12 to rotate about their longitudinal axis. However, the openings may also be realized in such a way that they restrict the mobility of the cross braces 11 in the region, in which the cross braces 11 extend through the longitudinal webs 15.

However, the cross braces 11 may also lie on the first lateral part 5, the second lateral part 6 and the longitudinal web 15 or the longitudinal webs 15 and be connected thereto from above, i.e., on the upper side 13. The cross braces 11 may also be connected to the side walls 5, 6 and the web 15 from below, i.e., on the underside 14. In all variations of this connection, it is important that the cross braces 11 and/or partial cross braces still have sufficient flexibility for preventing and/or counteracting the formation of ice by means of distortion and/or vibration. Everything mentioned with reference to FIGS. 1 to 4 also applies analogously to the embodiment shown in FIG. 5.

The engine intake flaps K generally may be coupled to the housing 102 of the engine 100 and adjustable by means of one respective actuator 110 or by means of a common actuator that acts upon the engine intake flaps K via a coupling device. According to the invention, an engine 100 is provided that features engine intake flaps K, on which at least one respective actuator 110 is arranged in order to adjust the respective engine intake flap K about its hinge axis, wherein the engine 100 is provided with an actuating device 112 that has an actuating function with an interface to a flight control system 120 and/or an engine control system 122 and is realized in such a way that it generates command signals for controlling the actuators 110 of the engine intake flaps K in response to the receipt of air data from the flight control system 120 and/or of a current or required engine power from the flight control system 120 and/or the engine control system 122 and transmits these commands signals to the actuators 110 of the engine intake flaps K so as to adjust the engine intake flaps K about their hinge axis (A) and thusly adjust the flow in the intake.

The actuating function may, in particular, be realized in such a way that it utilizes at least one of flow velocity of the aircraft and temperature of the flowing air that is measured (via one or more sensors 130) in the region of the engine intake as input signal to be used by the actuating function.

The inventive embodiments are generally intended for engines on an aircraft. Due to the adjustment of the inventive engine flaps K provided on the engine housing, the intake flow is optimized, the aerodynamic drag of the engine or intake housing is reduced and the influence of the ice formation on the engine or intake housing on the engine power is minimized. The command signals can be generated by the actuating device on the basis of value tables or calibration tables, in which a command signal value or a value such as, e.g., a standardized value or a correcting value for the actuators, from which a command signal value can be derived, is assigned to the aforementioned sensor values. In the latter instance, the actuating function has a corresponding function for deriving the command signal value.

According to another embodiment of the invention, the engine 100 (which may be considered an auxiliary engine) includes an engine or an Auxiliary Power Unit (also abbreviated APU) that is only activated occasionally in order to provide an emergency energy supply 140 (which may be considered an auxiliary energy supply) while the aircraft is in flight, particularly during a loss of performance of one or more main engines. According to the invention, an aircraft system that features an engine 100 according to one embodiment of the invention and an energy supply unit 140 is provided for this application. The actuating function also has a function, by means of which the flaps K can be moved between a shielding position, in which the minimum throughput of the intake flow is adjusted, and an open position, in which the maximum throughput of the intake flow is adjusted. The energy supply unit 140 may, in particular, have a function that transmits a command signal for moving or holding the engine intake flaps K in their shielding position to the actuating function when the energy supply unit 140 operates flawlessly and/or transmit a command signal for moving the engine intake flaps K into their open position to the actuating function when the energy supply unit 140 activates the auxiliary engine. The auxiliary engine 100 can be activated by the energy supply unit 140, in particular, when a loss of performance of at least one main engine is determined or detected. It would also be possible that the engine system detects a respectively occurring loss of performance and the engine system transmits a command signal for moving the intake flaps K into their open position to the actuating device 112.

The inventive actuating device for moving or actuating the intake flaps K may, in particular, form a functional component of the flight control system and/or the engine system for controlling and adjusting the aircraft engines.

List of Reference Symbols
1 Intake flap base body
1*a* First lateral edge
1*b* Second lateral edge
2 Intake flap extension part
3 First lateral edge of intake flap extension part 2
4 Second lateral edge of intake flap extension part 2
5 First lateral part
6 Second lateral part
7 Recess
8 Inner side
9 Inner side
10 Recess rear edge
11 Cross brace
12 Longitudinal brace
13 Upper side
14 Underside
15 Longitudinal web
A Hinge axis
E1 First end of engine intake flap K
E2 Second end of engine intake flap K
K Engine intake flap L Longitudinal direction of engine intake flap K
L11 Longitudinal direction of cross braces 11
L12 Longitudinal direction
Q11 Transverse direction of longitudinal braces 11
S Flow direction

The invention claimed is:

1. An engine intake flap that is designed for being arranged on a housing of an air intake or air intake channel of an aircraft engine, comprising:
   a first end and a second end that lies opposite of, and is spaced apart from, the first end in a longitudinal direction of the intake flap, wherein the longitudinal direction is directed opposite to a flow direction of air flowing into the engine during operation;
   an intake flap base body with a connecting device for a hinged connection in order to hinge the intake flap base body to the housing of the air intake or air intake channel with a hinge axis extending along the second end; and
   an intake flap extension part that is structurally integrated into the intake flap base body and features a first and a second lateral part that respectively originate at the intake flap base body and extend from two lateral edges of the intake flap that lie opposite of one another and extend in the longitudinal direction in a cantilever arrangement from the base body, as well as a plurality of cross braces that are arranged on, and extend between, the lateral parts transverse to the longitudinal direction.

2. The engine intake flap according to claim 1, wherein the intake flap base body and the intake flap extension part are manufactured in one piece.

3. The engine intake flap according to claim 1, wherein the intake flap extension part is mounted on the intake flap base body in the form of a component that can be attached to the intake flap base body.

4. The engine intake flap according to claim 1, wherein the cross braces are arranged on the first and second lateral parts in a rotationally rigid fashion.

5. The engine intake flap according to claim 1, wherein at least some of the cross braces are arranged on the first and second lateral parts such that they are rotatable about their longitudinal axis.

6. The engine intake flap according to claim 1, wherein the cross braces are manufactured of elastic material that is bent and/or distorted by the air flow that occurs during operation and flows along the longitudinal direction, namely to such a degree that an ice layer formed on the cross braces can be cracked off.

7. The engine intake flap according to claim 1, wherein:
   at least one longitudinal web that is arranged on the intake flap base body and extends in the longitudinal direction is arranged between the first and second lateral parts, and
   a plurality of the cross braces extends between one of the respective first and second lateral parts and a longitudinal web or between two longitudinal webs.

8. The engine intake flap according to claim 1, wherein the cross braces have a wing-shaped cross section.

9. The engine intake flap according to claim 8, wherein at least some of the cross braces are springably prestressed into a starting position.

10. An engine intake flap that is designed for being arranged on a housing of an air intake or air intake channel of an aircraft engine, comprising:
   a first end and a second end that lies opposite of, and is spaced apart from, the first end in a longitudinal direction of the intake flap, wherein the longitudinal direction L) is directed opposite to a flow direction of air flowing into the engine during operation;
   an intake flap base body with a connecting device for a hinged connection in order to hinge the intake flap base body to the housing of the air intake or air intake channel with a hinge axis extending along the second end;
   an intake flap extension part that is structurally integrated into the intake flap base body and features a first and a second lateral part that respectively originate at the intake flap base body and extend from the first and second lateral edges of the intake flap that lie opposite of one another and extend in the longitudinal direction in a cantilever arrangement from the base body; and
   a plurality of longitudinal braces that are arranged on the intake flap base body and respectively extend in the longitudinal direction of the intake flap in a cantilever arrangement from the base body.

11. The engine intake flap according to claim 10, wherein the intake flap base body and the intake flap extension part are manufactured in one piece.

12. The engine intake flap according to claim 10, wherein the intake flap extension part is mounted on the intake flap base body in the form of a component that can be attached to the intake flap base body (1).

13. The engine intake flap according to claim 10, wherein the longitudinal braces are manufactured of elastic material that is bent and/or distorted by the air flow that occurs during operation and flows along the longitudinal direction, namely to such a degree that an ice layer formed on the cross braces can be cracked off.

14. An aircraft engine, comprising:
   an air intake that is formed by an engine housing;
   at least one engine intake flap arranged on a front edge of the engine housing, wherein the engine intake flap is directed opposite to an air flow occurring during operation of the aircraft engine, wherein the at least one engine intake flap includes:
   a first end and a second end that lies opposite of, and is spaced apart from, the first end in a longitudinal direction of the intake flap, wherein the longitudinal direction is directed opposite to a flow direction of air flowing into the engine during operation;
   an intake flap base body with a connecting device for a hinged connection in order to hinge the intake flap base body to the housing of the air intake or air intake channel with a hinge axis extending along the second end; and
   an intake flap extension part that is structurally integrated into the intake flap base body and features a first and a second lateral part that respectively originate at the intake flap base body and extend from two lateral edges of the intake flap that lie opposite of one another and extend in the longitudinal direction in a cantilever arrangement from the base body, as well as a plurality of cross braces that are arranged on, and extend between, the lateral parts transverse to the longitudinal direction.

15. The aircraft engine according to claim 14, comprising several of the engine intake flaps arranged adjacent to one another along a circumference of the engine housing with reference to the flow direction.

16. The aircraft engine according to claim 15, comprising:
   at least one actuator for adjusting each of the respective engine intake flaps about its respective hinge axis, each actuator being respectively arranged on a respective one of the engine intake flaps; and
   an actuating device that has an actuating function with an interface to a flight control system and/or an engine control system and is realized in such a way that the actuating device generates command signals for controlling the actuators of the engine intake flaps in response to receipt of air data from the flight control system and/or of a current or required engine power from the flight control system and/or the engine control system and transmits these commands signals to the actuators of the engine intake flaps so as to adjust the engine intake flaps about their respective hinge axis and thusly adjust the flow in the air intake.

17. The aircraft engine according to claim 16, wherein at least one of:
    the actuating function is realized in such a way that it utilizes a flow velocity of the aircraft as air data; and
    a flow velocity and/or temperature of the flowing air that is measured in the region of the engine intake is utilized as input signal to be used by the actuating function.

18. The aircraft engine according to claim 15, wherein:
    the engine intake flaps are designed with longitudinal braces that are rotatable about their longitudinal axis, actuators are coupled to at least some of the longitudinal braces in order to vary a rotational position of the cross braces, and
    the engine is provided with an actuating device that has an actuating function with an interface to a flight control system and/or an engine control system and is realized in such a way that the actuating device can actuate the actuators for varying the rotational position of the cross braces in response to receipt of air data from the flight control system and/or of a current or required engine power from the flight control system and/or the engine control system so as to adjust the cross braces about their longitudinal axis and thusly adjust the flow in the air intake.

19. The aircraft engine according to claim 18, wherein at least one of:
    the actuating function is realized in such a way that it utilizes a flow velocity of the aircraft as air data; and
    a flow velocity and/or temperature of the flowing air that is measured in the region of the engine intake is utilized as input signal to be used by the actuating function.

20. The aircraft engine of claim 15, wherein the aircraft engine is an auxiliary engine, further comprising:
    an actuating device that has an actuating function with an interface to a flight control system and/or an engine control system and is realized in such a way that the actuating function facilitates moving the engine intake flaps between a shielding position, in which a minimum throughput of the air intake flow is adjusted, and an open position, in which a maximum throughput of the air intake flow is adjusted;
    an energy supply unit that transmits a command signal to the actuating function in order to move the engine intake flaps from their shielding position into their open position when the energy supply unit activates the auxiliary engine.

21. The aircraft engine of claim 20, comprising at least one actuator for adjusting each of the respective engine intake flaps about its respective hinge axis, each actuator being respectively arranged on a respective one of the engine intake flaps, wherein the actuating function operates such that the actuating device generates command signals for controlling the actuators of the engine intake flaps in response to receipt of air data from the flight control system and/or of a current or required engine power from the flight control system and/or the engine control system and transmits these commands signals to the actuators of the engine intake flaps so as to adjust the engine intake flaps about their respective hinge axis and thusly adjust the flow in the air intake.

22. aircraft engine of claim 20, wherein:
    the engine intake flaps are designed with longitudinal braces that are rotatable about their longitudinal axis, actuators are coupled to at least some of the longitudinal braces in order to vary a rotational position of the cross braces, and
    the actuating function operates such that the actuating device can actuate the actuators for varying the rotational position of the cross braces in response to receipt of air data from the flight control system and/or of a current or required engine power from the flight control system and/or the engine control system so as to adjust the cross braces about their longitudinal axis and thusly adjust the flow in the air intake.

* * * * *